United States Patent [19]

Miyake

[11] Patent Number: 4,789,802
[45] Date of Patent: Dec. 6, 1988

[54] HIGH VOLTAGE, MULTI-STAGE ELECTROSTATIC GENERATOR

[75] Inventor: Yosinobu Miyake, Tokyo, Japan

[73] Assignee: Japan Physitec Co., Ltd., Tokyo, Japan

[21] Appl. No.: 146,297

[22] Filed: Jan. 21, 1988

[30] Foreign Application Priority Data

Jan. 24, 1987 [JP] Japan .................................. 62-13335

[51] Int. Cl.$^4$ ............................................. H02N 1/00
[52] U.S. Cl. ..................................... 310/309; 310/308; 322/2 A
[58] Field of Search ....................... 310/308, 309, 310; 322/2 A

[56] References Cited

U.S. PATENT DOCUMENTS

| | | | |
|---|---|---|---|
| 2,577,446 | 12/1951 | Bosch | 310/309 |
| 2,610,994 | 9/1952 | Bosch et al. | |
| 2,662,191 | 12/1953 | Okey | |
| 2,831,988 | 4/1958 | Morel | 310/309 |
| 2,836,785 | 5/1958 | Neubert | 310/309 |
| 3,035,221 | 5/1962 | Gale | 322/2 |
| 3,469,118 | 9/1969 | Herb et al. | 310/309 |
| 3,614,481 | 10/1971 | Halliday | |
| 3,889,138 | 6/1975 | Allen et al. | 310/309 |
| 3,891,868 | 6/1975 | Joyce | 310/309 |

FOREIGN PATENT DOCUMENTS

| | | |
|---|---|---|
| 57-40380 | 3/1982 | Japan . |
| 62-7378 | 1/1987 | Japan . |
| 61-07506 | 12/1986 | World Int. Prop. O. .......... 310/309 |

Primary Examiner—Patrick R. Salce
Attorney, Agent, or Firm—Oblon, Fisher, Spivak, McClelland & Maier

[57] ABSTRACT

A high electrostatic voltage generator comprises insulated discs which form multi-staged charge carrier modules, a pair of conductive transfer pulleys contacting metal pellets on the outer circumferential rim of the charge carrier module to transfer positive and negative charges, and an electrostatic shielding body for enclosing the metal pellets arranged between the pulleys, to protect them from the influence of the external electric field. Charges induced in grounded and high voltage electrodes by the external electric field are discharged through discharger circuits formed in the charge carrying process to thereby automatically adjust the potential difference between the electrostatic shielding bodies on the uppermost and lowest charge carrier modules.

11 Claims, 7 Drawing Sheets

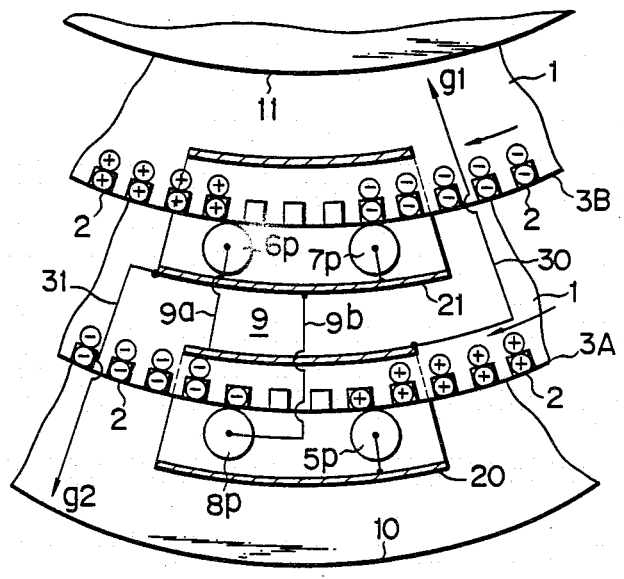
F I G. 3
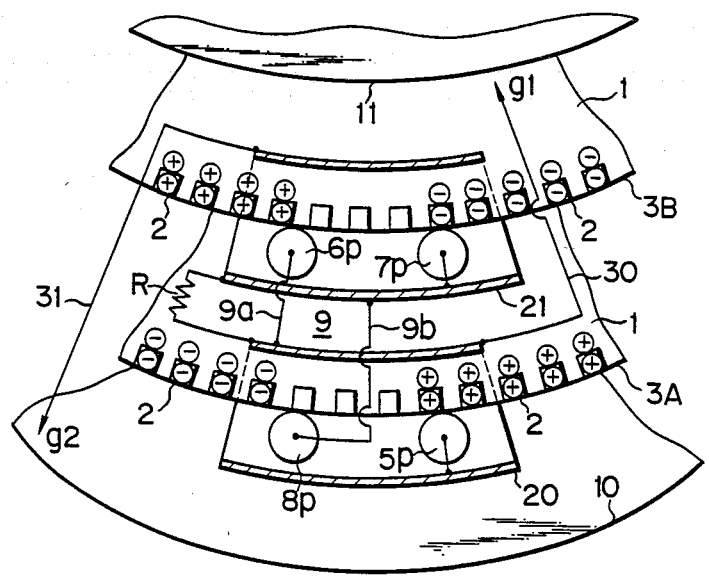
F I G. 4

HIGH VOLTAGE, MULTI-STAGE ELECTROSTATIC GENERATOR

BACKGROUND OF THE INVENTION

The present invention relates to a high electrostatic voltage generator comprising plural stages of charge carrier modules, piled one above another, and capable of generating a high voltage depending upon the number of the stages used and more particularly, it relates to a high electrostatic voltage generator capable of eliminating the influence of the external electric field and automatically adjusting the change of potential difference between the carrier modules because of charges excited by the external electric field.

The high electrostatic voltage generator including the charge carrier module formed by arranging metal pellets on an insulation disc along the outer circumferential rim thereof with a certain interval interposed between the adjacent metal pellets and intending to generate a high voltage by carrying charges while rotating the charge carrier module was made well known by Japanese Patent Disclosure No. 57-40380 and so on.

Further, the inventor of the present invention also disclosed in Japanese Patent Application Disclosure No. 62-7378 a high electrostatic voltage generator wherein plural charge carrier modules of the disc type are piled one above another, and a charge carrier transfer means is arranged between the adjacent charge carrier modules, so that a high voltage can be generated, depending upon the number of the charge carrier modules used.

Arrangements and principles of the high electrostatic voltage generator of this prior art are shown in FIG. 1. Charge carrier module 3 is formed by arranging metal pellets 2 on insulation disc 1 along the outer circumferential rim thereof with a certain interval interposed between the adjacent pellets, plural charge carrier modules 3A and 3B are attached, one upon the other, to insulation shaft 4 connected directly to the electric motor, and they are rotated at high speed in an insulation gas filled case.

Positive charges carried from the low voltage side of charge carrier module 3A are received by conductive pulley 5P of discharger 5, fed to conductive pulley 6P of inductor 6 on charge carrier module 3B through cross circuit 9a of charge carrier transfer means 9 and discharged to metal pellets 2 of charge carrier module 3B through this conductive pulley 6P to be carried to the high voltage side of charge carrier module 3B. Similarly, negative charges carried from the high voltage side are received by conductive pulley 7P of discharger 7, fed to conductive pulley 8P of inductor 8 on charge carrier module 3A through cross circuit 9b of charge carrier transfer means 9 and discharged to metal pellets 2 on charge carrier module 3A and fed to discharger 5, thereby generating a high voltage.

It has been confirmed that even the small-sized high electrostatic voltage generator can generate a voltage of 1 MV.

In the case of charge carrier transfer means 9 including inductors 6, 8, dischargers 5, 7, and cross circuits 9a, 9b, it operates with stability when the electric field intensity is about 2 MV/M in the direction of the shaft. In the case of the high electrostatic voltage generator device with an ultra-high potential slope wherein a strong electric field acts on grounded electrode 10 and high voltage electrode 11, however, all of charges cannot be picked up only by inductors 6, 8 and dischargers 5, 7 when the external electric field enters into conductive pulleys 5P and 8P where charges are received and fed, and the rate of those charges which escape through dischargers 5 and 7 becomes large as shown in FIG. 1. All of the external electric field entering into conductive pulleys 5P, 6P, 7P and 8P, and those which are caused between conductive pulleys 5P and 8P and between conductive pulleys 7P and 6P serve to reduce the charge transfer efficiency of charge carrier transfer means 9.

Positive charges are induced at conductive pulley 5P in discharger 5, for example, due to the external electric field of grounded electrode 10. Therefore, those positive charges which are carried by pellets 2 of charge carrier module 3A cannot be collected completely because of the current collecting capacity of conductive pulley 5P and a part of the positive charges is left in pellets 2 and carried toward inductor 8 together with rotating disc 1. Similarly, negative charges are induced at conductive pulley 7P in discharger 7 due to the external electric field of high voltage electrode 11. Therefore, those negative charges which are induced by pellets 2 of charge carrier module 3B cannot be collected completely by conductive pulley 7P and a part of the negative charges is carried toward inductor 6 along with rotating disc 1. This causes the potential difference to be changed between the uppermost stage and the lowest stage of charge carrier module.

When charge carrier modules are used in multi-stage manner, the charge transfer means, including the inductors, dischargers and conductive pulleys, is also arranged in multi-stage manner. Therefore, the charge transfer capacity of the whole generator is reduced remarkably. The high electrostatic voltage generator of this type reduces its charge transfer capacity remarkably in proportion to the square of the number of the charge transfer means used, and it cannot be sometimes put to practical use, accordingly.

SUMMARY OF THE INVENTION

The object of the present invention is to provide a high electrostatic voltage generator capable withstanding the influence of the external electric field and automatically adjusting the change of potential difference because of charges excited by the external electric field.

In order to achieve this object, a high electrostatic voltage generator of the present invention includes two conductive pulleys attached to a charge carrier module and serving as the charge carrier transfer means, an electrostatic shielding means for enclosing plural metal pellets between the two conductive pulleys, and a discharger means for causing those charges, which are induced by the external electric field, to be discharged in the charge carrying process so as to automatically adjust the potential difference.

When arranged as described above, the high electrostatic voltage generator of the present invention can withstand the influence of the external electric field by the electrostatic shielding means and cause those charges which are induced by the external electric field to be discharged through a discharger circuit formed during the charge carrying process, even when they enter into the grounded or high voltage electrode, thereby automatically adjusting the change of the potential difference between both electrostatic shielding

BRIEF DESCRIPTION OF THE DRAWINGS

FIG. 3 is an enlarged sectional view showing a charge carrier transfer section in FIG. 1 to explain charge carrier and discharge passages;

FIG. 4 is an enlarged sectional view showing the charge carrier transfer section to explain a discharge passage different from the one shown in FIG. 3;

DETAILED DESCRIPTION OF THE PREFERRED EMBODIMENTS

Figure 1:
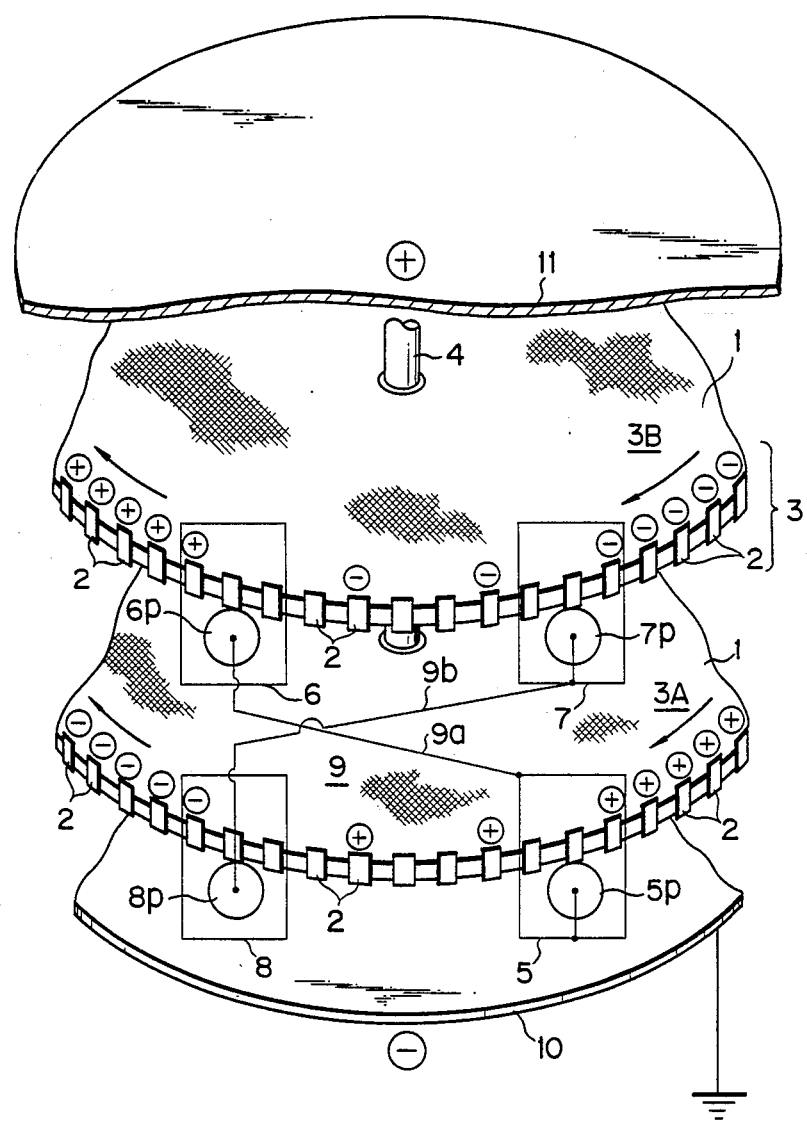
FIG. 1 is a perspective view showing the main portion of the conventional high electrostatic voltage generator to explain the principle and operation thereof.

The present invention will be described with reference to its embodiments shown in FIGS. 2 through 8. A high electrostatic voltage generator of the present invention shown in FIG. 2 also includes first and second stages of charge carrier modules 3A and 3B each formed by arranging metal pellets 2 on insulation disc 1 along the outer circumferential rim thereof with a certain interval interposed between adjacent pellets 2; insulated rotating shaft 4 connected directly to motor M and having charge carrier modules 3A and 3B attached one upon the other; and charge transfer means 9 comprising conductive pulleys 5P, 8P and 6P, 7P made of carbon fibers and attached to charge carrier modules 3A and 3B, respectively, and cross circuits 9a and 9b arranged between charge carrier modules 3A and 3B to connect these conductive pulleys; wherein charge carrier modules are rotated in an insulation gas.

Figure 2:
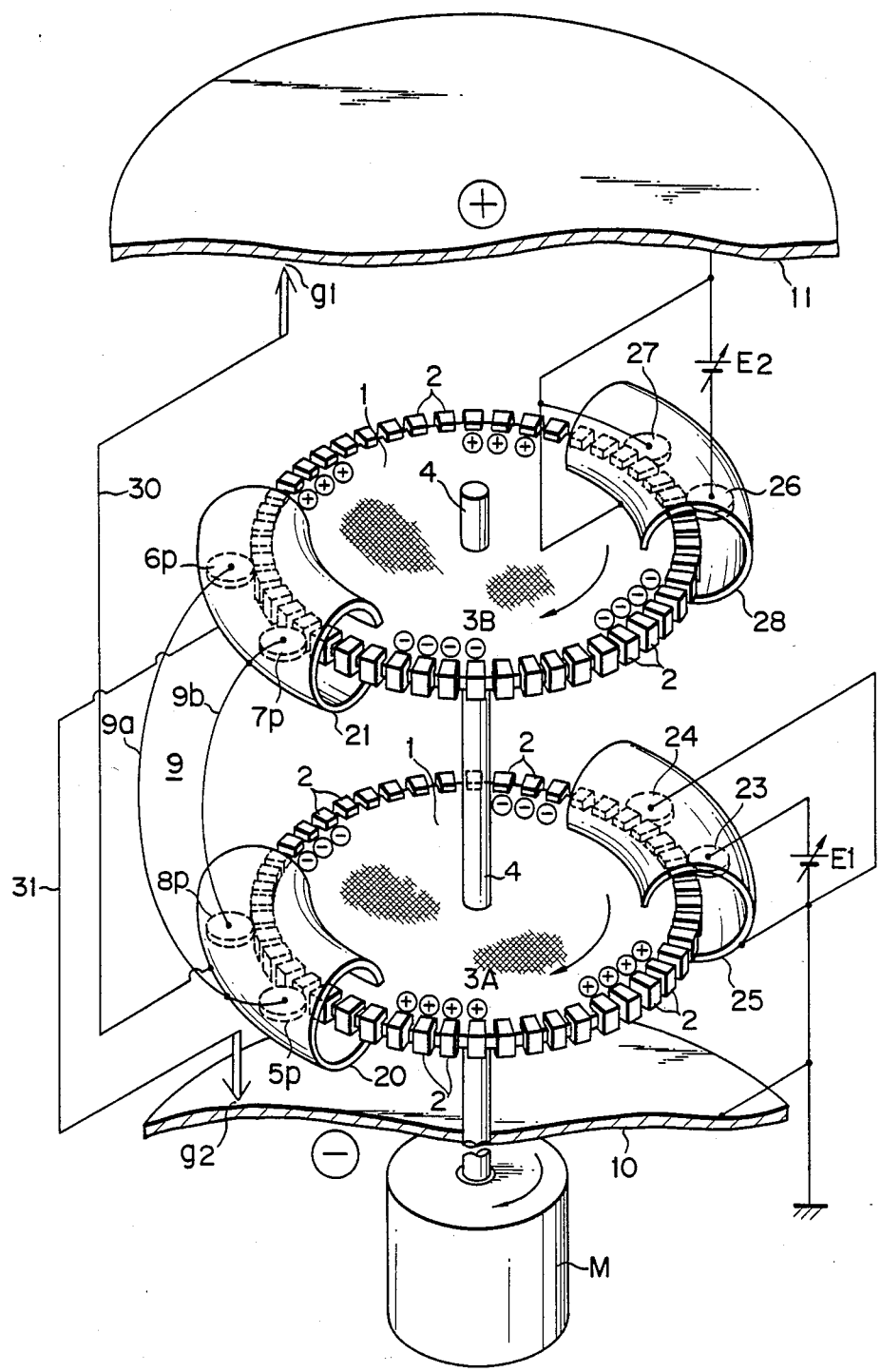
FIG. 2 is a perspective view showing the main portion of a high electrostatic voltage generator according to the present invention.

The high electrostatic voltage generator of the present invention is characterized by comprising charge transfer means 9 including conductive transfer pulleys 5P, 8P and 6P, 7P attached to adjacent charge carrier modules 3A and 3B, respectively. In FIG. 2, conductive transfer pulleys 5P and 8P attached to first stage of charge carrier module 3A and metal pellets 2 arranged between these pulleys 5P and 8P are enclosed by first stage horseshoe-shaped electrostatic shielding body 20. Conductive transfer pulleys 6P and 7P attached to the second stage of charge carrier module 3B and metal pellets 2 arranged between these pulleys 6P and 7P are also enclosed by second stage horseshoe-shaped electrostatic shielding body 21.

In the model shown in FIG. 3, conductive transfer pulley 5P is electrically connected to first stage electrostatic shielding body 20, and conductive transfer pulley 8P is connected to second stage electrostatic shielding body 21 through cross circuit 9b, which extends not contacting with first stage electrostatic shielding body 20. Conductive pulley 7P is electrically connected to second stage electrostatic shielding body 21 while conductive pulley 6P is connected to first stage electrostatic shielding body 20 through cross circuit 9a, which extends not contacting with electrostatic shielding body 21. Therefore, conductive pulley 5P in electrostatic shielding body 20 is connected to conductive pulley 6P in electrostatic shielding body 21 through electrostatic shielding body 20 and cross circuit 9a. Similarly, conductive pulley 7P in electrostatic shielding body 21 is connected to conductive pulley 8P in electrostatic shielding body 20 through electrostatic shielding body 21 and cross circuit 9b. The connector circuit including cross circuits 9a, 9b, first stage electrostatic shielding body 20, conductive transfer pulleys 5P, 8P in first stage electrostatic shielding body 20, second stage electrostatic shielding body 21, and conductive transfer pulleys 6P, 7P in second stage electrostatic shielding body 21 form charge carrier transfer means 9 for positive and negative charges between charge carrier modules 3A and 3B. Positive and negative charges are stored during the charge carrying process in first and second stage electrostatic shielding bodies 20 and 21, respectively on these charge carrier transfer passages.

The amount of charge stored in electrostatic shielding body 20 is preferably equal to that of charge stored in electrostatic shielding body 21. Therefore, as shown in FIGS. 2 and 3, a discharger circuit is provided including corona point $g_1$ of discharger line 30 connected to electrostatic shielding body 20 and corona point $g_2$ of discharger line 31 connected to electrostatic shielding body 21, corona point $g_1$ being opposed to a high positive potential electrode such as high voltage electrode 11, and corona point $g_2$ a high negative potential electrode such as grounded electrode 10. This discharger circuit is intended to keep the potential difference appropriate between both electrostatic shielding bodies 20 and 21 in such a way that when the potential of electrostatic shielding body 20 or 21 falls lower than a predetermined value because of the external electric field, discharge is caused through corona point $g_1$ or $g_2$ and corona current thus flows from high voltage electrode 11 or grounded electrode 10 to electrostatic shielding body 20 or 21 to condense positive or negative charges there.

Conductive pulley 23 for collecting positive charges and conductive pulley 24 for collecting negative charges are positioned on charge carrier module 3A, opposing to first stage electrostatic shielding body 20 on charge carrier module 3A, and they are enclosed together with metal pellets 2 between them by horseshoe-shaped electrostatic shielding body 25. Conductive pulley 23 is connected to the positive side of DC power source $E_1$ while conductive pulley 24 is connected to the negative side of DC power source $E_1$ and to grounded electrode 10. similarly, conductive pulley 26 for collecting negative charges and conductive pulley 27 for collecting positive charges are positioned on charge carrier module 3B, opposing second electrostatic shielding body 21 on charge carrier module 3B, and they are enclosed together with metal pellets 2 between them by horseshoe-shaped electrostatic shielding body 28. Conductive pulley 26 is connected to the negative side of DC power source $E_2$ and conductive pulley 27 to the positive side of DC power source $E_2$ and to high voltage electrode 11.

Operation of the high electrostatic voltage generator of the present invention will now be described. Both of charge carrier modules 3A and 3B are rotated in a direction shown by arrows in FIG. 2 by electric motor M. Positive charges applied from positive charges collecting and conductive pulley 23 on the low voltage side to metal pellets 2 on charge carrier module 3A are carried into first stage electrostatic shielding body 20 when insulation disc 1 is rotated. The positive charges of metal pellets 2 are received by conductive transfer pulley 5P in first stage electrostatic shielding body 20 and condensed in electrostatic shielding body 20 and fed from this electrostatic shielding body 20 through cross circuit 9a to conductive pulley 6P and then from conductive pulley 6P in second stage electrostatic shielding body 21 on charge carrier module 3B to metal pellets 2 on insulation disc 1.

In FIG. 2, the positive charges applied to metal pellets 2 on charge carrier module 3B are fed into electrostatic shielding body 28, as insulation disc 1 is rotated in the direction shown by the arrow, received by positive charges collecting on conductive pulley 27 and condensed in high voltage electrode 11 to thereby generate a high voltage of positive polarity.

On the other hand, negative charges applied from negative charges collecting on conductive pulley 26 to metal pellets 2 on insulation disc 1 on which charge carrier module 3B is formed are fed into second stage electrostatic shielding body 21 when insulation disc 1 is rotated in the direction shown by the arrow. The negative charges fed into electrostatic shielding body 21 are received by conductive pulley 7P, condensed in electrostatic shielding body 21 and then applied from conductive pulley 8P on charge carrier module 3A to metal pellets 2 on insulation disc 1 after passing through cross circuit 9b. The negative charges of metal pellets 2 are collected by conductive pulley 24 in electrostatic shielding body 25 and condensed in grounded electrode 10.

The above is the manner of generating a high electrostatic voltage when the high electrostatic voltage generator of the present invention is commonly operated. When this generator is operated in strong electric field, however, grounded electrode 10 has a high negative potential and high voltage electrode 11 has a high positive potential in the external electric field. Therefore, grounded electrode 10 of high negative potential tends to induce a considerable amount of positive charges in conductive pulleys 5P and 8P on charge carrier module 3A and also in metal pellets 2 adjacent to them. High voltage electrode of high positive potential tends to induce a considerable amount of negative charge in conductive pulleys 6P and 7P on charge carrier module 3B and also in metal pellets 2 adjacent to them.

In the case of the present invention, however, conductive pulleys 5P, 8P, 23, 24 and 6P, 7P, 26, 27 on charge carrier modules 3A and 3B are enclosed and thus electrostatically shielded along with metal pellets 2 between these pulleys by first and second stage electrostatic shielding bodies 20, 21, 25 and 26, so that the entering of strong external electric fields from grounded and high voltage electrodes 10 and 11 can be effectively prevented.

Further, reversely-symbolized charges enough to counterbalance those which are induced by these external electric fields, can be automatically mounted on metal pellets 2 which are coming out of each horseshoe-shaped electrostatic shielding body. This is achieved in such a manner that the potential difference between first and second stage electrostatic shielding bodies 20 and 21 automatically changes to counterbalance the inducing effect of the external electric fields which act on each of the pellets. The reason why this potential difference can be automatically adjusted is that the absolute values of charges which metal pellets 2 give to and receive from charging and discharging conductive pulleys 5P, 6P and 7P, 8P in horseshoe-shaped electrostatic shielding bodies 20 and 21 tend to become equal to one another when charges induced by the external electric fields and entering into electrostatic shielding bodies 20 and 21 are combined with one of the discharger circuits shown in FIGS. 3, 4 and 5. Giving and receiving of charges between conductive pulleys 5P, 8P and 6P, 7P are thus protected from the influence of the external electric fields. Therefore, its power generating capacity is not lowered even when the high electrostatic voltage generator is operated at a high voltage.

Positive charges fed with metal pellets 2 are condensed in first stage electrostatic shielding body 20 on charge carrier module 3A, while negative charges fed with metal pellets are condensed in second stage electrostatic shielding body 21 on charge carrier module 3B. These positive and negative charges carried are preferably equal in amount.

Because of the strong external electric field, however, corona current flows from grounded electrode 10 into electrostatic shielding body 20 on charge carrier module 3A and negative charges are condensed there, while corona current flows from high voltage electrode 11 into electrostatic shielding body 21 on charge carrier module 3B and positive charges are condensed there. The condensation of these negative and positive charges because of this strong external electric field limits those charges which are to mount on the pellets, and serves to reduce the potential difference between electrostatic shielding bodies 20 and 21. This reduced potential difference lowers the efficiency of transferring charges when the charges are given and received between charge carrier modules 3A and 3B.

When the potential difference between electrostatic shielding bodies 20 and 21 shifts from an appropriate value in the present invention, discharges are caused between corona points $g_1$, $g_2$, which serve as the discharger means of those embodiments shown in FIGS. 2 and 3, and high voltage and grounded electrodes 10, 11. Therefore, positive charges are added to electrostatic shielding body 20, passing through high voltage electrode 11, corona point $g_1$ and discharger line 30, while negative charges are added to electrostatic shielding body 21, passing through grounded electrode 10, corona point $g_2$ and discharger line 31, so that the potential difference between electrostatic shielding bodies 20 and 21 can be effectively adjusted to the appropriate value. As a discharger circuit for adjusting the potential difference between electrostatic shielding bodies 20 and 21, corona points $g_1$, $g_2$, and discharger lines 30, 31 may be used together with high resistance R, as shown in FIG. 4.

Figure 5:
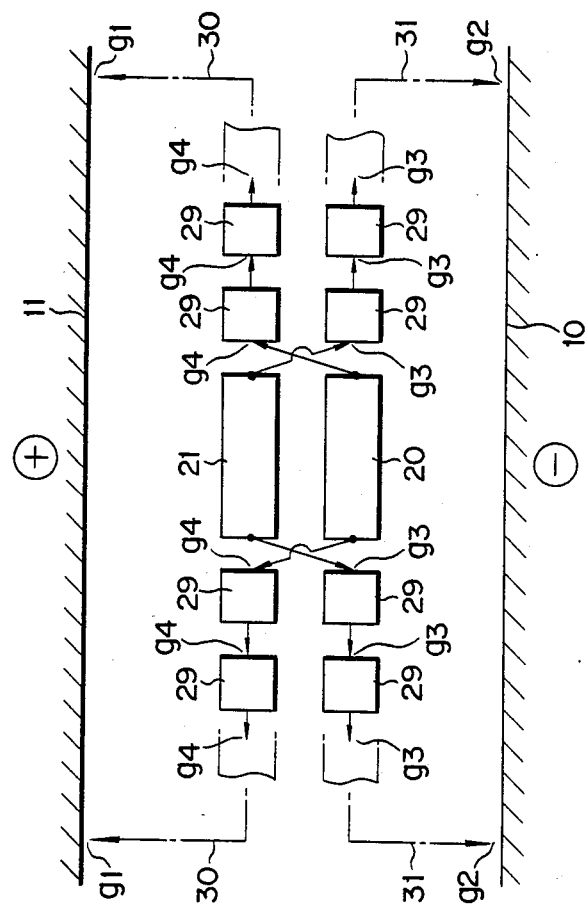
FIG. 5 shows an example of the discharger circuit according to the present invention.

In the case of the embodiment shown in FIG. 5, plural insulated corona protection plates 29 are arranged on the outer circumferential rim of each of insulation discs 1 and between electrostatic shillding bodies 20 and 25 and between electrostatic shielding bodies 21 and 28 on charge carrier modules 3A and 3B. A discharger circuit is therefore formed including corona points $g_3$ arranged between electrostatic shielding body 21 and corona protection plates 29, corona points $g_4$ arranged between electrostatic shielding body 20 and corona protection plates 29, and corona points $g_1$ and $g_2$ opposed to high voltage and grounded electrodes 11 and 10, respectively.

Figure 7:
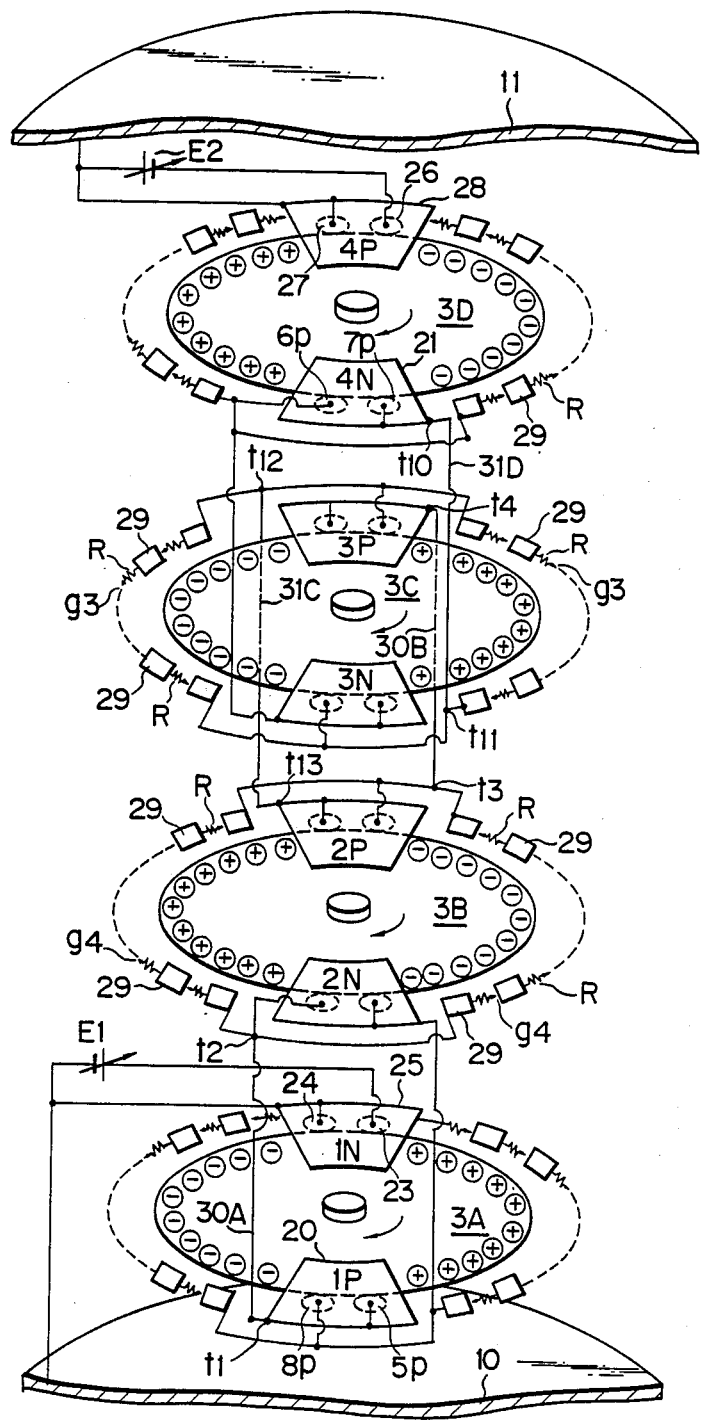
FIG. 7 shows a further embodiment of the present invention to explain the charge carrier and discharge passages when four stages of the charge carrier modules are employed in the embodiment shown in FIG. 2.

A further embodiment shown in FIG. 7 is similar to the one shown in FIG. 2. Four stages of charge carrier modules 3A, 3B, 3C and 3D are piled one upon the other, charge carrying passages are connected in cascade, and the potential stabilizing circuit comprising corona protection plates 29, resistances R, and corona points $g_3$, $g_4$ on each of charge carrier modules 3A–3D is used as the discharger circuit. Namely, the embodiment shown in FIG. 7 is same as the one shown in FIG. 2 in that two conductive transfer pulleys are enclosed by an electrostatic shielding body on each of charge carrier modules 3A–3D.

In FIG. 7, however, the electrostatic shielding bodies on each of charge carrier modules 3A–3D are represented by symbols 1P–1N, 2P–2N, 3P–3N and 4P–4N, respectively, and explanation of them will be omitted. The conductive pulleys and the electrostatic shielding bodies on first and fourth stages of charge carrier modules 3A and 3D are represented by the same symbols as those in FIG. 2, for convenience of explanation.

The charge carrying manner in FIG. 7 is same as that in FIG. 2. More specifically, positive charges mounted on the metal pellets through conductive pulley 23 in electrostatic shielding body 1N (25) on first stage of charge carrier module 3A are collected by conductive pulley 5P in electrostatic shielding body 1P (20) and carried to second stage of charge carrier module 3B. The positive charges mounted on the metal pellets in electrostatic shielding body 2N of charge carrier module 3B are carried to third stage of charge carrier module 3C through the conductive pulley in electrostatic shielding body 2P. The positive charges mounted on the metal pellets through the conductive pulley in electrostatic shielding body 3P are collected by the conductive pulley in electrostatic shielding body 3N and carried to electrostatic shielding body 4N (21) on fourth stage of charge carrier module 3D. The positive charges mounted on the metal pellets through conductive pulley 6P in electrostatic shielding body 4N (21) are collected by conductive pulley 27 in electrostatic shielding body 4P (28) and condensed in high voltage electrode 11.

On the other hand, negative charges mounted on the metal pellets in electrostatic shielding body 4P (28) on fourth stage of charge carrier module 3D are carried from electrostatic shielding body 4N (21) to electrostatic shielding body 3N on third stage of charge carrier module 3C, then similarly to second stage of charge carrier module 3B, and the negative charges mounted on the metal pellets through conductive pulley 8P in electrostatic shielding body 1P (20) on first stage of charge carrier module 3A are finally collected by conductive pulley 24 in electrostatic shielding body 1N (25) and condensed in grounded electrode 10.

As described above, the positive and negative charges are efficiently carried, using charge carrier modules 3A–3D and the charge carrier transfer means, and a high voltage is generated between high voltage electrode 11 and grounded electrode 10.

Potentials of electrostatic shielding bodies (1N–1P) to (4P–4N) on charge carrier modules 3A–3D have relation with $4P > (4N < 3N) > (3P < 2P) > (2N < 1P) > 1N$. When the discharger circuit of electrostatic shielding body 1P (20) on first stage of charge carrier module 3A is followed, therefore, it extends through point $t_1$; connecting line 30A; point $t_2$; circuit consisting of corona protection plates 29, resistances R and corona point $g_4$ on charge carrier module 3B; point $t_3$; connecting line 30B; and reaches electrostatic shielding body 3N on charge carrier module 3C at point $t_4$. When the discharger circuit of electrostatic shielding body 4N (21) on fourth stage of charge carrier module 3D is followed, it extends through point $t_{10}$; connecting line 31D; point $t_{11}$; circuit consisting of corona protection plates 29, resistances R, and corona point $g_3$ on charge carrier module 3C; point $t_{12}$; connecting line 31C; and reaches electrostatic shielding body 2P on second stage of charge carrier module 3B at point $t_{13}$.

The potential of electrostatic shielding body 2P is higher than that of electrostatic shielding body 3P and the potential of electrostatic shielding body 3N is higher than that of electrostatic shielding body 4N (21) in this discharger circuit. This potential is determined depending upon how corona protection plates 29, and corona points $g_3$, $g_4$ which enter into and come out of each of the electrostatic shielding bodies are arranged on each of the charge carrier modules, the corona current applied from outside, and the amount of charge given and received between the metal pellets and each of the electrostatic shielding bodies on the charge carrier module. The potential difference between the electrostatic shielding bodies is automatically adjusted to let the charge transfer efficiency between the charge carrier modules usually reach 100%.

Figure 6:
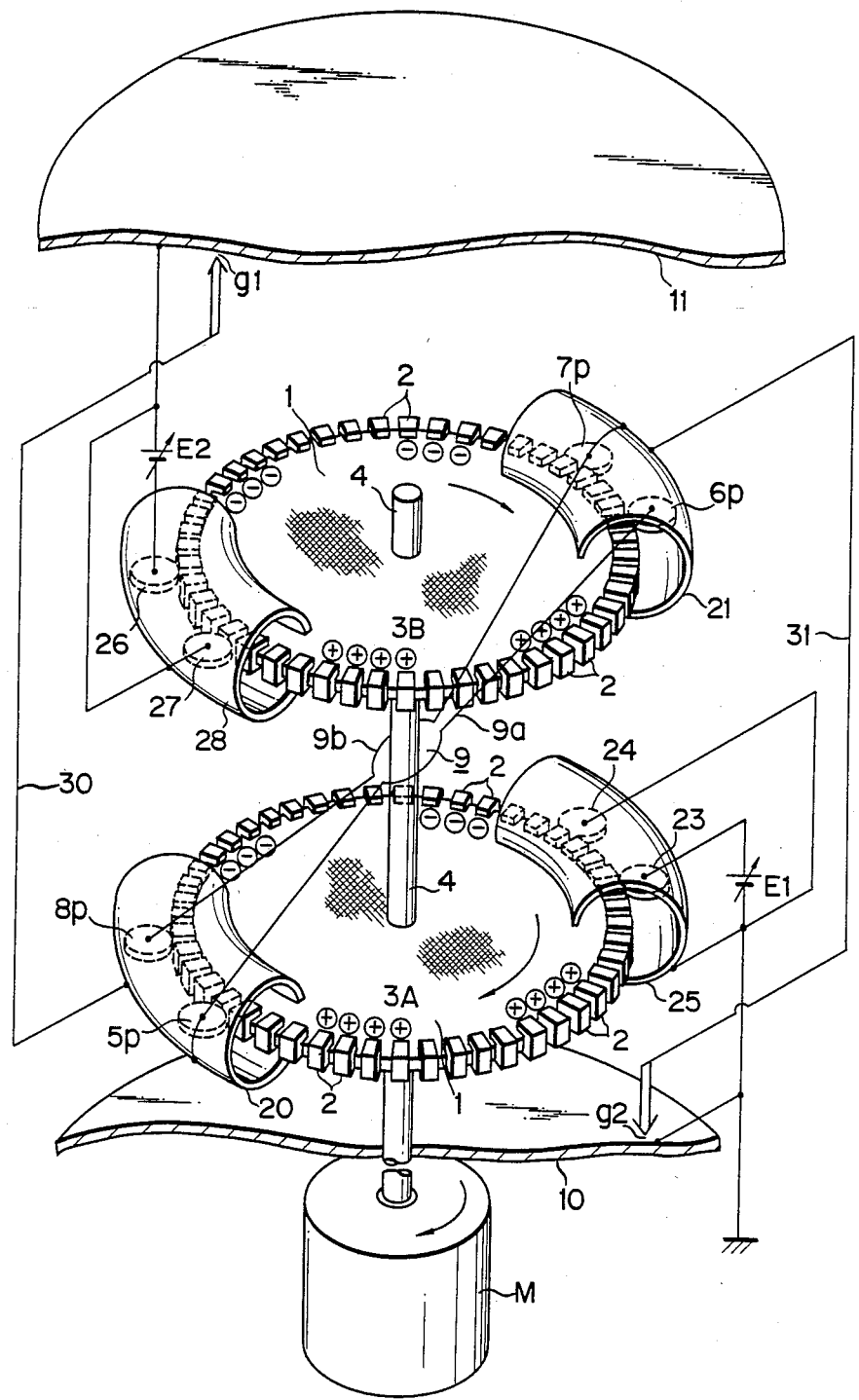
FIG. 6 is a perspective view showing another embodiment of the present invention which is different in connection from the one shown in FIG. 5.

In the case of a still further embodiment shown in FIG. 6, a pair of horseshoe-shaped electrostatic shielding bodies 20 and 21 which form charge transfer means 9 are shifted from each other by 180° in the circumferential direction of rotating insulated disc 1 round driving shaft 4. When the high voltage generator system has this arrangement, voltage is applied between electrostatic shielding bodies 20 and 28 and between electrostatic shielding bodies 25 and 21 in FIG. 6 in the axial direction between the upper and lower rotating insulated discs, while, in FIG. 2, voltage is applied between electrostatic shielding bodies 25 and 28. A potential difference two times higher than the potential in the radial direction of rotating insulated disc 1 is applied between electrostatic shielding bodies 25 and 28 in FIG. 2, but only the potential in the radial direction of rotating insulated disc 1 is applied between electrostatic shielding bodies 20 and 28 and between electrostatic shielding bodies 25 and 21, respectively, in FIG. 6. So much high voltage can be generated and maintained. Two rotating insulated discs 1 are used in FIGS. 2 and 6, but as the number of rotating insulated discs 1 laminated is further increased, the potential of which the generator shown in FIG. 6 is capable becomes substantially two times larger than that in FIG. 2.

Figure 8:
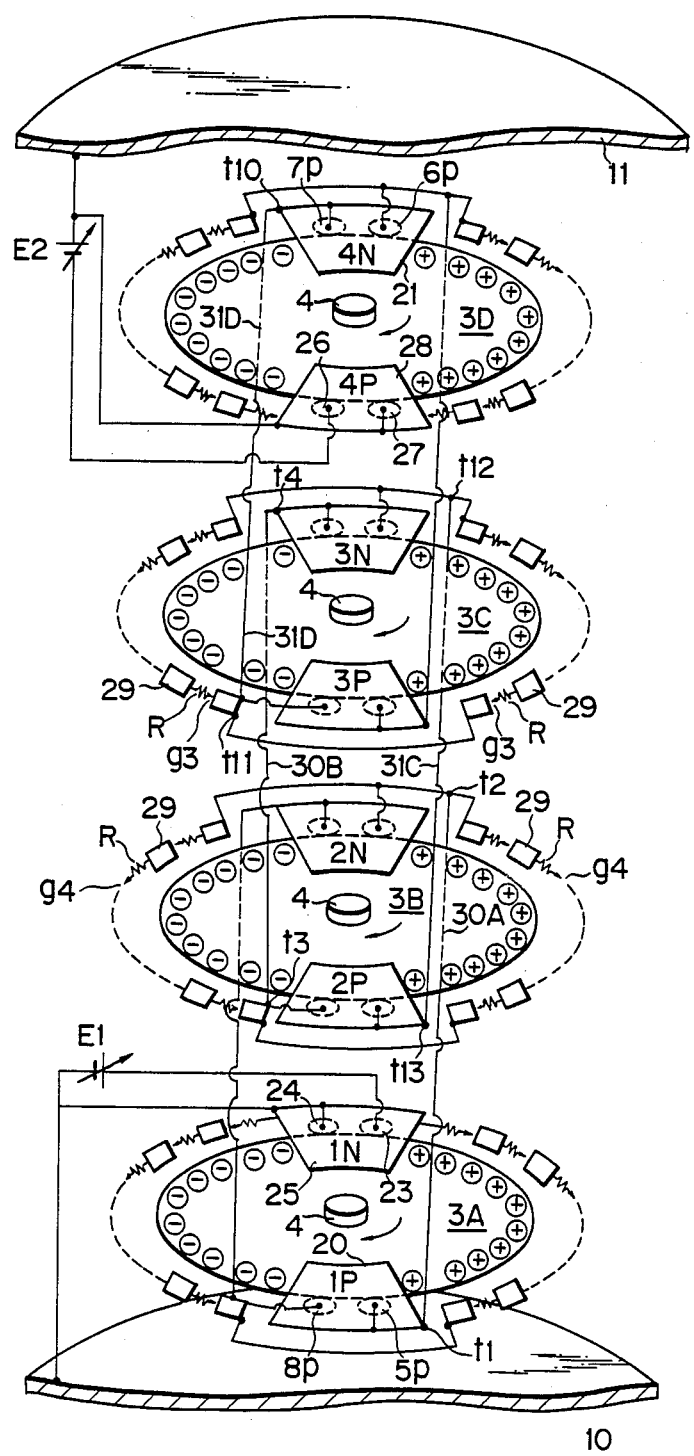
FIG. 8 shows a still further embodiment of the present invention to explain the charge carrier and discharge passages when four stages of the charge carrier modules are employed in the embodiment shown in FIG. 6.

A still further embodiment shown in FIG. 8 is similar to the one shown in FIG. 6. Four stages of charge carrier modules 3A, 3B, 3C and 3D are piled one upon the other and points for carrying charges between charge carrier modules are shifted from each other by 180° round driving shaft 4. Therefore, charges are carried by the metal pellets between charge carrier modules 3A and 3B, between 3B and 3C, and between 3C and 3D in such a form that positive charges are opposed to positive ones and negative charges are opposed to negative ones.

The charges carrying manner between charge carrier modules in FIG. 8 is the same as in FIG. 7 except that the charges are carried to the 180°-shifted position. Only the potential in the radial direction of each of the charge carrier modules is applied between this charge carrier module and its adjacent one and the insulating distance between the charge carrier modules can be therefore made narrower than in FIG. 7.

The discharger circuit of electrostatic shielding body 1P (20) on first stage charge carrier module 3A in FIG. 8 extends through point $t_1$ of electrostatic shielding body 1P; connecting line 30A; point $t_2$; circuit consisting of corona protection plates 29, resistances R, and corona point $g_4$; point $t_3$; connecting line 30B; and then reaches electrostatic shielding body 3N on the third stage of charge carrier module 3C at point $t_4$. The discharger circuit of electrostatic shielding body 4N (21) on the fourth stage of charge carrier module 3D extends through point $t_{10}$ of electrostatic shielding body 4N; connecting line 31D; point $t_{11}$; circuit consisting of corona protection plates 29, resistances R and corona points $g_3$ on third stage of charge carrier module 3C; point $t_{12}$; connecting line 31C; and then reaches electrostatic shielding body 2P on second stage of charge carrier module 3B at point $t_{13}$.

Because of corona current flowing through corona points $g_3$ and $g_4$, 1P is higher in potential than 2N, 2P is higher in potential than 3N, and 3P is higher in potential than 4N in this discharger circuit. The potential is determined depending upon how corona points $g_3$ and $g_4$ which enters into and comes out of the electrostatic shielding bodies are arranged on their corresponding charge carrier modules, the corona current applied from outside, and the amount of charge given and received between the metal pellets and the electrostatic shielding bodies on the charge carrier module, and the potential difference of each electrostatic shielding body is automatically adjusted in such a way that the charge transferring efficiency becomes equal to 1 between the charge carrier modules.

According to the present invention as described above, the conductive pulleys and the metal pellets adjacent to them, which form the charge transfer means between the charge carrier modules piled one upon the other, are enclosed and electrostatically shielded by a horseshoe-shaped electrostatic shielding body, and the external discharger circuit is provided to add charges when the potential difference between the two electrostatic shielding bodies shifts from an appropriate value. The charge giving and receiving efficiency can be therefore held to 100% even under strong external electric fields. A stable and high electrostatic voltage can be thus generated even when the potential generated is in an extremely high inclining slope.

What is claimed is:
1. A high electrostatic voltage generator comprising:
(a) plural stages of charge carrier modules, each module including an insulated disc and a plurality of metal pellets arranged on the outer circumferential rim of said disc to carry positive or negative charges;
(b) a charge supply means including positive or negative charges collecting and conductive pulleys contacted with the metal pellets at least on the lowest and uppermost stages of charge carrier modules so as to charge the metal pellets positive or negative on these charge carrier modules;
(c) a driving source means comprising a rotating shaft on which the plural stages of charge carrier modules are arranged with a certain interval interposed between the modules, and a motor for rotating the plural stages of charge carrier modules as a whole through the rotating shaft;
(d) a charge carrier transfer means for transferring charges between the adjacent charge carrier modules, and including a first positive collecting and conductive transfer pulley contacted with the metal pellets on the insulated disc in one of the charge carrier modules, a first negative charge collecting and conductive transfer pulley for collecting negative charges from the other of the charge carrier modules, a second conductive transfer pulley contacted with the metal pellets on the insulated disc in the other of the charge carrier modules and for collecting positive charges transferred from the first positive charge collecting and conductive transfer pulley on one of the charge carrier modules, a second negative charge collecting and conductive transfer pulley for transferring negative charges to the first negative charge collecting and conductive transfer pulley on one of the charge carrier modules, a first electrostatic shielding body for enclosing the first positive and negative charge collecting and conductive transfer pulleys on one of the charge carrier modules and also enclosing the metal pellets arranged between these first pulleys on the outer circumferential rim of this insulated disc, a second electrostatic shielding body for enclosing the second positive and negative charge collecting and conductive transfer pulleys on the other of the charge carrier modules and also enclosing the metal pellets arranged between these second pulleys on the outer circumferential rim of this insulated disc, and means for connecting the first positive charge collecting and conductive transfer pulley, the first electrostatic shielding body, and the second positive charge collecting and conductive transfer pulley, and also connecting the second negative charge collecting and conductive transfer pulley, the second electrostatic shielding body, and the first negative charge collecting and conductive transfer pulley;
(e) a conductive pulley contacted with the metal pellets on the outer circumferential rim of the insulated disc in the other of the charge carrier modules, to collect positive charges transferred from the second positive charge collecting and conductive transfer pulley on one of the charge carrier modules;
(f) a third electrostatic shielding body for enclosing the negative charge collecting and conductive pulley on the other of the charge carrier modules, the positive charge collecting and conductive pulley, and the metal pellets arranged between these pulleys on the outer circumferential rim of this insulated disc;
(g) a conductive pulley contacted with the metal pellets arranged on the outer circumferential rim of the insulated disc in the one of the charge carrier modules, to collect negative charges transferred from the first negative collecting and conductive transfer pulley;
(h) a fourth electrostatic shielding body for enclosing the positive collecting and conductive pulley on the one of the charge carrier modules, the negative charge collecting and conductive pulley, and the metal pellets arranged between these pulleys on the outer circumferential, rim of this insulated disc;

(i) a grounded electrode arranged adjacent to the one of the charge carrier modules and connected to the negative charge collecting and conductive pulleys to condense collected negative charges therein;

(j) a high voltage electrode arranged adjacent to the other of the charge carrier modules and contacted with the positive charge collecting and conductive pulleys to condense collected positive charges therein and generate a high voltage; and (k) a discharger circuit means including a first discharger circuit connected, at one end thereof, to the electrostatic shielding body positioned most adjacent to the grounded electrode and formed connecting high potential portions to automatically adjust the change of potential difference between the electrostatic, shielding body arranged most adjacent to the grounded electrode and the electrostatic shielding body arranged most adjacent to the high voltage electrode, said change of potential difference being caused, by the negative charges condensed in the grounded electrode, and a second discharger circuit connected, at one end thereof, to the electrostatic shielding body arranged most adjacent to the high voltage electrode and formed connecting low potential portions to automatically adjust the change of potential difference between the electrostatic shielding body arranged most adjacent to the high voltage electrode and the electrostatic shielding body arranged most adjacent to the grounded electrode said change of potential difference being caused by the positive charges condensed in the high voltage electrode.

2. A high electrostatic voltage generator according to claim 1, wherein the second electrostatic shielding body on the other of the charge carrier modules is positioned shifting by 180° round the rotating shaft from the first electrostatic shielding body on the one of the charge carrier modules.

3. A high electrostatic voltage generator according to claim 1, wherein the first discharger circuit comprises plural corona points and corona protection plates alternately arranged between the second and third electrostatic shielding bodies on the other of the charge carrier modules and connected to the first electrostatic shielding body.

4. A high electrostatic voltage generator according to claim 3, wherein the first discharger circuit further includes a final corona point arranged opposite to the high voltage electrode.

5. A high electrostatic voltage generator according to claim 1, wherein the first discharger circuit has a corona point which is connected at one end thereof to the electrostatic shielding body arranged most adjacent to the grounded electrode and opposed at the other end thereof to the high voltage electrode.

6. A high electrostatic voltage generator according to claim 1, wherein the second discharger circuit comprises plural corona points and corona protection plates alternately arranged between the first and fourth electrostatic shielding bodies on one of the charge carrier modules and connected to the second electrostatic shielding body.

7. A high electrostatic voltage generator according to claim 6, wherein the second discharger circuit further includes a final corona point opposed to the grounded electrode.

8. A high electrostatic voltage generator according to claim 1, wherein the second discharger circuit includes a corona point which is connected at one end thereof to the electrostatic shielding body positioned most adjacent to the high voltage electrode and opposed at the other end thereof to the grounded electrode.

9. A high electrostatic voltage generator according to claim 1, wherein the discharger circuit means includes high resistances connected between the electrostatic shielding body of the first discharger circuit and that of the second discharger circuit.

10. A high electrostatic voltage generator according to claim 1, wherein the multi-staged charge carrier modules are four.

11. A high electrostatic voltage generator according to claim 2, wherein the multi-staged charge carrier modules are four, and the third electrostatic shielding body on the third charge carrier module is position shifted by 180° round the rotating shaft from the second electrostatic shielding body, and the fourth electrostatic shielding body on the fourth charge carrier module is position shifted by 180° round the rotating shaft from the third electrostatic shielding body.

* * * * *